Patented Aug. 23, 1932

1,873,344

UNITED STATES PATENT OFFICE

ARNOLD SHEPHERDSON, OF BLACKLEY, MANCHESTER, ENGLAND, ASSIGNOR TO BRITISH DYESTUFFS CORPORATION LIMITED, OF MANCHESTER, ENGLAND, A CORPORATION OF GREAT BRITAIN AND IRELAND

MANUFACTURE OF ANTHRAQUINONE DERIVATIVES

No Drawing. Application filed December 17, 1926, Serial No. 155,550, and in Great Britain March 27, 1926.

By the condensation of unsulphonated halogen derivatives of anthraquinone with unsulphonated arylamines, valuable intermediates (for example, 1-methylamino-4-p-toluido-anthraquinone) largely used in the manufacture of sulphonated wool dyestuffs, are obtained. These condensation products have hitherto been prepared by heating the halogenated anthraquinone with a large excess of the arylamine, both being in a dry state. Additions of catalysts and acid binding agents such as, for instance, anhydrous sodium acetate, have been made. In the reaction, it is necessary to have the arylamine present as a reagent taking part in the actions by which the new molecule is formed; and it is also necessary to have a solvent or diluent present. In the usual process, sufficient arylamine is used to subserve both purposes. When the arylamine is costly, this procedure is uneconomical as a considerable amount of the excess arylamine used for solvent purposes cannot readily be recovered. In some cases an addition of various organic solvents has been proposed to reduce the quantity of arylamine required, but this complicates matters by entailing recovery of arylamine from mixed solvents.

I have now found a cheaper method of preparing these condensation products in which I use as a diluent a relatively large amount of crystallized sodium acetate melted in its water of crystallization. Crystallized sodium acetate begins to melt at 58° C. and is thinly liquid at higher temperatures, forming an excellent diluent for the reaction mixture. In so doing, instead of using four or more parts of arylamine to one part of halogenated anthraquinone, 1 part of arylamine will now usually suffice. Also, any excess of arylamine unused in the reaction is easily recoverable from the reaction mixture.

To accomplish this in accordance with this invention, the reaction is carried out by heating together an unsulphonated arylamine and an unsulphonated halogenated anthraquinone, in about equal proportions by weight, in the presence of sodium acetate crystals, the sodium acetate acting as a diluent or flux and also as an acid binding agent for the hydrochloric acid liberated. Further, the reaction mixture is afterwards worked up by pouring it into sufficient weak hydrochloric acid to convert any excess of arylamine into its hydrochloride. After filtration, the crude base remains as a filter paste and excess arylamine is recovered from the filtrate by addition of alkalies. The crude base may be dried and purified by heating with organic solvents, or the following cheap and simple procedure may be adopted. The filter paste is dissolved in sulphuric acid, and water added whilst stirring the mixture. By filtration, pure base or its sulphate is obtained, and impurities are removed in the acid filtrate. Instead of dissolving in sulphuric acid and adding water, the filter paste can be treated with sulphuric acid of suitable strength, so that the impurities are dissolved and the pure base or its sulphate can be collected by filtration. In both cases, after removal of acid from the filter paste by washing with water with or without the addition of alkali, the pure condensation product is obtained.

The new reaction method may be carried out in open or closed vessels. In place of sodium acetate crystals a mixture of anhydrous or partially anhydrous sodium acetate with the corresponding amount of water may be used. Crystallized sodium acetate is $NaC_2H_3O_2.3H_2O$ and carries about 40 per cent $H_2O$. The amount of water may be varied within reasonable limits, and moisture present in the arylamine used is not detrimental.

My process can be described briefly as the condensing together of an unsulphonated arylamine, such as p-toluidine with an unsulphonated halogenated anthraquinone having the probable structure

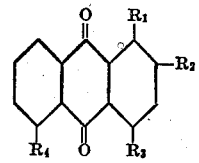

wherein $R_1$ represents a halogen atom, an amino or an alkylamino group, and $R_2$, $R_3$ and $R_4$ represent hydrogen or a halogen atom, not more than two halogen atoms being present in the molecule, the said condensation being in the presence of a substantial amount of a concentrated aqueous sodium acetate solution or in the presence of sodium acetate melted in its water of crystallization. After this condensation the further steps of my process may consist in purification methods.

The aqueous sodium acetate solution is used in my process as a reaction medium or as a blending agent. For efficient stirring during the course of the reaction, it is necessary to reduce the viscosity of the mixture of arylamine and halogenated anthraquinone. In prior processes this has been done either by adding an excess of the arylamine or by employing an inert organic solvent. An anhydrous acid binding agent was used in these processes merely to absorb the liberated acid, while in my process I use an aqueous solution of the acid binding agent as the blending agent. When sulphonated arylamines or anthraquinones were used, in prior art processes, it has been proposed to employ dilute aqueous solutions, since the sulphonated body is somewhat soluble in water. But in the case of unsulphonated compounds the use of water has previously been strictly avoided.

The following examples illustrate the method of carrying out my invention but I do not limit myself to the particular details thereof.

*Example 1.—Preparation of 1-amino-2-brom-4-p-toluido-anthraquinone*

Heat together with good stirring for six hours at 110° C. 20 parts of 2:4-dibrom-1-amino-anthraquinone with 40 parts of sodium acetate crystals, 24 parts of p-toluidine, and 0.4 parts of copper acetate. Pour the warm reaction mixture into 500 parts of hot water containing 50 parts of hydrochloric acid (30 per cent). Boil a few minutes, filter hot, and wash until the filtrate is colourless. Dissolve the granular filter cake in 200 parts of 98 per cent sulphuric acid and add water with stirring at the ordinary or slightly higher temperature until the acid strength is reduced to 65 per cent. Filter, wash acid free, and dry the 1-amino-2-brom-4-toluido-anthraquinone obtained.

*Example 2.—Preparation of 1-methylamino-4-p-toluido-anthraquinone*

This may be prepared by following the procedure of Example 1, but using 20 parts of 1-methylamino-4-brom-anthraquinone instead of the 1-amino-2:4-dibrom-anthraquinone.

*Example 3.—Preparation of 1:5-di-p-toluido-anthraquinone*

Heat together in an autoclave 20 parts of 1:5-dichlor-anthraquinone, 40 parts of sodium acetate crystals, 30 parts of p-toluidine and 0.4 parts of copper acetate. Maintain a temperature of 180° C. for 5 hours, cool and work up the product according to the details of Example 1.

What I claim and desire to secure by Letters Patent is:—

1. A process for the manufacture of 1-methylamino-4-p-toluido-anthraquinone by heating 1-methylamino-4-brom-anthraquinone with sodium acetate crystals in sufficient amount to furnish a molten liquid serving as a blending agent, p-toluidine and copper acetate, pouring the warm reaction mixture into dilute hydrochloric acid, boiling a few minutes, filtering hot, washing, dissolving the filter cake in dilute sulphuric acid, filtering, washing acid free and drying.

2. A process for the manufacture of 1-methylamino-4-p-toluido-anthraquinone by heating with stirring for six hours at 110° C. 20 parts of 1-methylamino-4-brom-anthraquinone with 40 parts of sodium acetate crystals, 24 parts of p-toluidine and 0.4 parts of copper acetate, pouring the warm reaction mixture into 500 parts of hot water containing 50 parts of hydrochloric acid (30 per cent), boiling a few minutes, filtering hot, washing till the filtrate is colourless, dissolving the filter cake in 200 parts of 98 per cent sulphuric acid, adding water with stirring at about ordinary temperature until the acid strength is reduced to 65 per cent, filtering, washing acid free and drying.

3. In the manufacture of arylamino-anthraquinones, the process which comprises condensing an unsulphonated arylamine with an unsulphonated halogenated anthraquinone in the presence of a strong aqueous solution of sodium acetate.

4. In the manufacture of arylamino-anthraquinones, the process which comprises condensing an unsulphonated arylamine with an unsulphonated halogenated anthraquinone in the presence of sodium acetate melted in its water of crystallization.

5. In the manufacture of arylamino-anthraquinones, the process which comprises condensing an unsulphonated arylamine with an unsulphonated halogenated anthraquinone in the presence of sodium acetate melted in its water of crystallization, treating the reaction mixture with hydrochloric acid and recovering the said arylamino-anthraquinone.

6. In the manufacture of arylamino-anthraquinones, the process which comprises condensing p-toluidine with an unsulphonated halogenated anthraquinone in the presence of sodium acetate melted in its water of crystallization.

7. In the manufacture of arylamino-anthraquinones, the process which comprises condensing p-toluidine with an unsulphonated halogenated anthraquinone in the presence of a strong aqueous solution of sodium acetate, treating the reaction mixture with hydrochloric acid and recovering the said arylamino-anthraquinone.

8. In the manufacture of arylamino-anthraquinones, the process which comprises condensing together an unsulphonated arylamino and an unsulphonated halogenated anthraquinone in the presence of a substantial amount of a strong aqueous solution of sodium acetate, the said sodium acetate serving as a blending agent, treating the reaction product thus obtained with hydrochloric acid, filtering to recover the said arylamino-anthraquinone as a filter paste, and then purifying the arylamino-anthraquinone by dissolving the said filter paste in sulfuric acid, filtering to separate the arylamino-anthraquinone from the filtrate containing dissolved impurities and washing the arylamino-anthraquinone free from acid.

9. In the manufacture of arylamino-anthraquinones, the process which comprises condensing together an unsulphonated arylamine and a halogenated anthraquinone having the probable structure

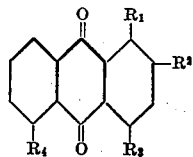

wherein $R_1$ represents a hologen atom, an amino or alkylamino group, and $R_2$, $R_3$ and $R_4$ represent hydrogen or halogen atoms, and which contains at least one halogen atom but in which not more than two halogen atoms are present, the said condensation being in the presence of a substantial amount of a strong aqueous solution of sodium acetate, the said strong aqueous solution serving as a blending agent.

10. In the manufacture of arylamino-anthraquinones, the process which comprises condensing together p-toluidine and a halogenated anthraquinone having the probable structure

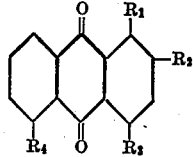

wherein $R_1$ represents a halogen atom, an amino or alkylamino group, and $R_2$, $R_3$ and $R_4$ represent hydrogen or halogen atoms, and which contains at least one halogen atom but in which not more than two halogen atoms are present, the said condensation being in the presence of a substantial amount of crystallized sodium acetate melted in its water of crystallization, the said melted sodium acetate serving as a diluent and flux.

11. In the manufacture of arylamino-anthraquinones, the process which comprises condensing together p-toluidine and a halogenated anthraquinone having the probable structure

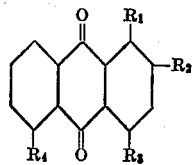

wherein $R_1$ represents a bromine atom, or an amino or alkylamino group, and $R_2$, $R_3$ and $R_4$ represent hydrogen or bromine atoms, and which contains at least one bromine atom but in which not more than two bromine atoms are present, the said condensation being in the presence of a substantial amount of crystallized sodium acetate melted in its water of crystallization, the said melted sodium acetate serving as a diluent and flux.

12. In the manufacture of 1-methylamino-4-p-toluido-anthraquinone, the process which comprises condensing together a 1-methylamino-4-halogen-anthraquinone with p-toluidine in the presence of a strong aqueous solution of sodium acetate, and recovering the resulting said 1-methylamino-4-p-toluido-anthraquinone.

In testimony whereof I affix my signature.

ARNOLD SHEPHERDSON.